(12) United States Patent
Boucher et al.

(10) Patent No.: US 8,882,450 B2
(45) Date of Patent: Nov. 11, 2014

(54) DEVICE FOR SUPPORTING AND SECURING A PIECE OF EQUIPMENT ON AN AIRCRAFT ENGINE OR NACELLE CASE

(75) Inventors: Brice Boucher, Brie-Comte-Robert (FR); Jean-Marc Cosquer, Moissy-Cramayel (FR); Alain Guerber, Valence en Brie (FR); Jacques Russmann, Champdeuil (FR)

(73) Assignee: Hispano Suiza, Colombes (FR)

( * ) Notice: Subject to any disclaimer, the term of this patent is extended or adjusted under 35 U.S.C. 154(b) by 967 days.

(21) Appl. No.: 12/919,918

(22) PCT Filed: Feb. 28, 2009

(86) PCT No.: PCT/FR2009/000191
§ 371 (c)(1),
(2), (4) Date: Aug. 27, 2010

(87) PCT Pub. No.: WO2009/118470
PCT Pub. Date: Oct. 1, 2009

(65) Prior Publication Data
US 2011/0002782 A1    Jan. 6, 2011

(30) Foreign Application Priority Data
Feb. 29, 2008 (FR) ...................... 08 01136

(51) Int. Cl.
*F01D 25/04* (2006.01)
*F01D 25/28* (2006.01)
*F16F 1/38* (2006.01)

(52) U.S. Cl.
CPC ......... *F16F 1/3849* (2013.01); *F16F 2230/007* (2013.01)
USPC ... 415/119; 415/213.1; 267/136; 267/140.11; 248/638

(58) Field of Classification Search
USPC ......... 415/119, 213.1, 215.1, 214.1; 267/136, 267/140, 140.4, 141, 140.11, 140.13; 248/638, 636, 564, 610, 634
See application file for complete search history.

(56) References Cited

U.S. PATENT DOCUMENTS

| | | | | |
|---|---|---|---|---|
| 2,367,830 | A * | 1/1945 | Kubaugh | 267/141.7 |
| 2,751,179 | A * | 6/1956 | Oravec | 267/140.4 |
| 3,721,417 | A * | 3/1973 | Skala et al. | 267/140.11 |
| 4,151,822 | A | 5/1979 | Miura et al. | |
| 4,716,722 | A * | 1/1988 | Rambach | 60/39.83 |
| 2003/0067104 | A1 | 4/2003 | Takashima et al. | |
| 2004/0201150 | A1* | 10/2004 | Okanaka et al. | 267/140.11 |
| 2006/0237598 | A1 | 10/2006 | Ferragut et al. | |

FOREIGN PATENT DOCUMENTS

| | | |
|---|---|---|
| EP | 0 622 560 | 11/1994 |
| EP | 1 302 694 | 4/2003 |
| EP | 1 703 188 | 9/2006 |

* cited by examiner

*Primary Examiner* — Edward Look
*Assistant Examiner* — Jason Davis
(74) *Attorney, Agent, or Firm* — Oblon, Spivak, McClelland, Maier & Neustadt, L.L.P.

(57) ABSTRACT

A device for supporting and securing a piece of equipment on an aircraft engine or nacelle case, including a vibration damper including a first part secured to the case and a second coaxial part rigidly connected to the piece of equipment, the damper associated with a safety member configured to hold the damper in place on the case in the event of damper failure or breakage. The safety member, which is independent of the damper, is mounted astride the damper and secured to the case.

20 Claims, 4 Drawing Sheets

Figure 1:
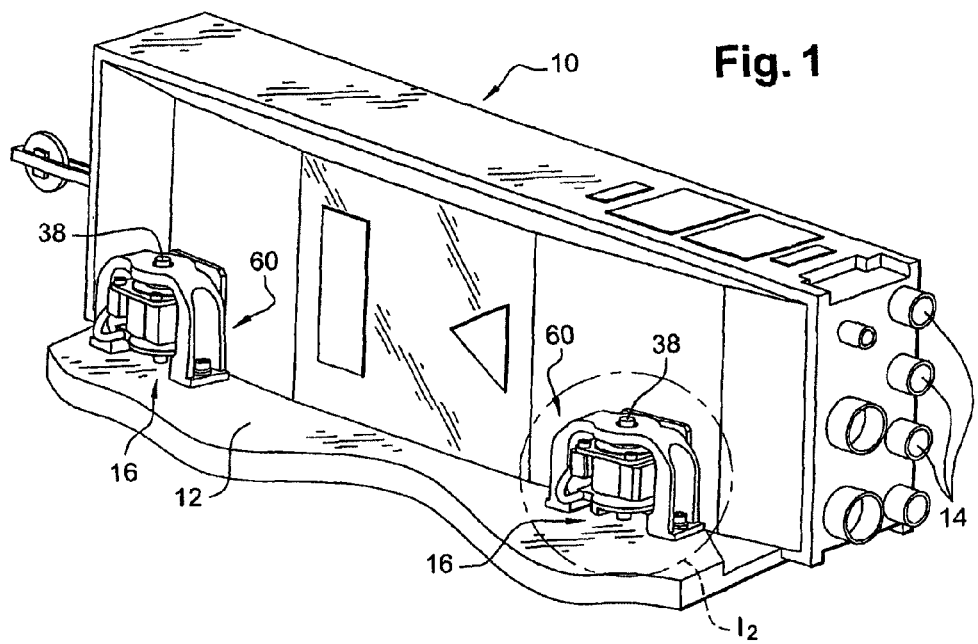

DEVICE FOR SUPPORTING AND SECURING A PIECE OF EQUIPMENT ON AN AIRCRAFT ENGINE OR NACELLE CASE

The present invention relates to a device for supporting and fixing equipment to a nacelle fairing or aircraft engine fairing, whereby this type of device allows the equipment to be suspended so as to insulate it from the vibrations and shocks to which it is subjected in operation.

An aircraft engine consists of a turbine engine surrounded by a nacelle which can carry one or more pieces of equipment, for example electrical equipment, such as computing units, control units and/or power units, whereby each piece of equipment is fixed to a fairing of the nacelle by means of a device consisting of vibration dampers. Equipment may also be fixed to a fairing of the turbine engine with the aid of vibration dampers.

In a known manner, each damper consists of a first part which is fixed to the fairing, and a second part which is mounted coaxially around the first part and is connected to the first part by elastically deformable means. The second part of the damper is fixed to the equipment so as to suspend this equipment on the fairing of the nacelle or the turbine engine.

This damper absorbs the shocks and vibrations to which the fairing is subjected in operation, so as to limit the interfering movements of the equipment in operation.

In the fortunately rare event of the breakage and loss of a fan blade of the turbine engine, this blade is ejected outwards and strikes the nacelle of the turbine engine carrying this equipment. An extremely violent shock occurs, which may damage the dampers fitted to the nacelle.

Moreover, after the loss of a fan blade in flight and the voluntary shutdown of the engine, the fan wheel is rotated by the air rushing into the nacelle of the engine, due to the windmilling effect.

This phenomenon is characterised by low-frequency (10-15 Hz) and high-amplitude (50 to 60 mm movement) vibrations of the structures carried by the nacelle. These vibrations result in accelerated deterioration of the dampers as well as fatigue and a risk of breakage of the means used to fix the dampers to the nacelle fairing. The service life of the dampers is currently around ten minutes during the windmilling phenomenon, which is very short and not sufficient to allow the aircraft pilot to make an emergency landing at the closest airport.

There is therefore a high risk of the equipment supported by these dampers becoming detached; since this equipment is relatively heavy (10 to 15 kilograms), they can in turn collide with and destroy the nacelle.

The notable purpose of the invention is to provide a simple, effective and economical solution to these problems of the prior art, which relate in particular to the relative fragility of the fixation means of the dampers used.

For this purpose, it proposes a safety device for the support and fixation of equipment to a nacelle fairing or aircraft engine, whereby this device consists of at least one vibration damper consisting of a first part intended to be fixed to the fairing, and a second part connected by elastically deformable means to the first part and intended to be connected rigidly to the equipment so as to suspend this equipment on the fairing, characterised in that each damper is associated with a safety device intended to keep the damper in place on the fairing in the event of the failure or breakage of this damper, to ensure the support and fixation of the equipment, whereby this safety device is independent of the damper and is mounted crosswise on the damper, and this device consists of a middle part that caps or covers at least one part of the damper and opposite lateral ends intended to be fixed on the fairing, whereby the means for fixing the device to the fairing are independent of the means for fixing the damper to the fairing.

According to the invention, each vibration damper is combined with an additional safety device that keeps the damper in place on the fairing, even when this damper is worn or damaged or its means of fixation to the fairing have been destroyed. In the case of the loss of a fan blade and the ejection of this blade onto the nacelle, the equipment suspended on this nacelle by the device according to the invention is kept in place and has no risk of becoming detached thanks to the safety device. In a particular embodiment of the invention, the safety device allows the equipment to be held in place for at least three hours during the windmilling phenomenon, which is sufficient time for the pilot to reach the closest airport and land. (An aircraft equipped with this type of device may thus obtain the ETOPS 180 certification.)

According to another characteristic of the invention, the device is mounted crosswise on the damper and consists on the one hand of a middle part that at least partly caps or covers the first part of the damper, and on the other hand of the opposed lateral ends intended to be fixed to the fairing.

The crosswise mounting of the safety device on the vibration damper ensures good support for the damper and prevents it from moving during operation. It also permits access to the damper and the fixation means of this damper on the fairing and the equipment, without the need to disassemble this device. For example, it allows the insertion of a tool for tightening/loosening the screws for fixing the damper to the equipment.

The device is carried on the damper and is fixed directly onto the fairing. The means for fixing the device on the fairing are independent of the means for fixing the damper on the fairing. In the event of the breakage of the means of fixing the damper on the fairing, the safety device ensures the fixation and support of the damper on the fairing. The middle part of the device caps the damper and allows this damper to be held in place by preventing it from separating from the fairing. This middle part of the device is connected to fixation means on the fairing.

The middle part of the device preferably consists of a flat plate with a circular or rectangular shape, where this shape is, for example, adapted to one end of the damper so as to fully cover this end.

According to another characteristic of the invention, the plate forming the middle part of the device includes, at its two opposite ends, lateral feet for fixation on the fairing. As a variant, the plate and the device may be fixed directly to the fairing, or even by means of tensioned cables.

The feet and the plate of the device preferably consist of a single part. This device may be made of metal or a composite material. It may be rigid or elastically deformable.

The feet of the device may be shaped such that the device has the form of a stirrup or a horseshoe, i.e. a general Ω shape, or an inverted V or U shape.

The feet of the device are noticeably parallel to each other or form between them an angle of between 30 and 90° approximately. They have a general S shape, and may also include one or more slits extending along the axis of the damper, so as to give these feet a certain flexibility.

As a variant, the feet of the device may have a C-shaped section to increase the rigidity of the feet and the device and to allow the insertion of a tightening/loosening tool.

In yet another variant, the middle part and the lateral feet of the device are made from substantially flat plates, whereby these plates contain, on their sides, rounded edges oriented towards the damper. This allows the stirrup to be made more rigid and limits its deformations in flexion and torsion.

In a simple way, the feet may include, at their free ends, small plates or support edges on the fairing, whereby these small plates or edges consist of orifices for inserting the screws for fixing the device to the fairing.

Preferably, a gasket is sandwiched between the middle part of the device and one upper end of the first part of the damper. This gasket consists, for example, of an elastically deformable material such as an elastomer. It can catch any play in the mounting of the device, absorb some of the shocks and vibrations to which the damper is subjected in operation, and may also improve the mechanical performance of the damper and the device with a higher friction coefficient.

The gasket may be housed in a lower reinforcement of the middle part of the device. The upper end of the damper may also be housed at least partly inside this reinforcement so as to keep this damper in the correct position during operation.

The invention also relates to an aircraft engine consisting of a turbine engine surrounded coaxially by a nacelle, characterised in that it consists of at least one piece of equipment suspended on a turbine engine fairing or a nacelle fairing by a device as described above.

Figure 2:
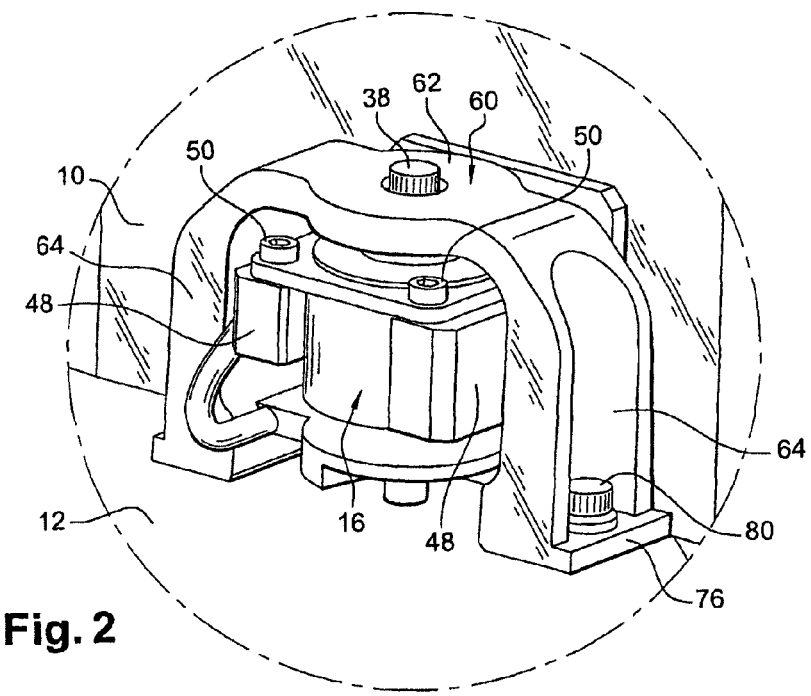
Figure 3:
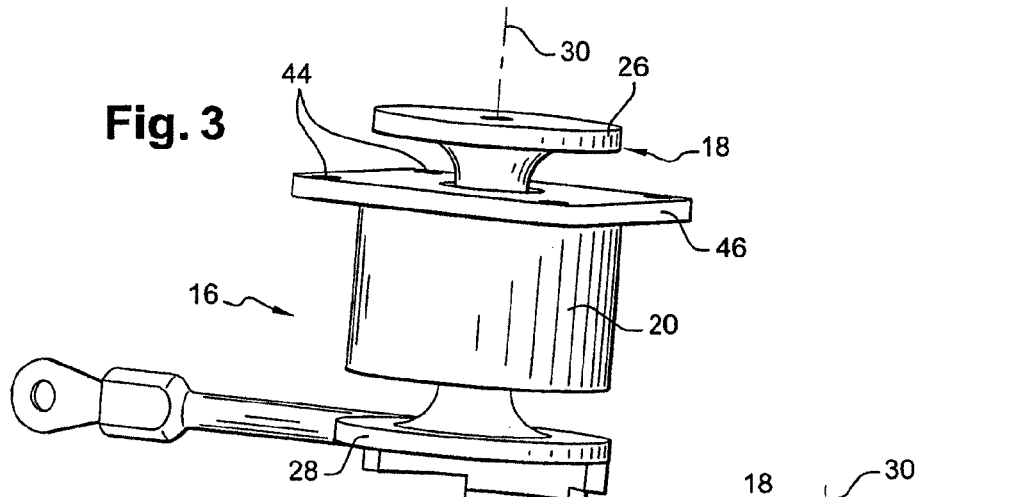
Figure 4:
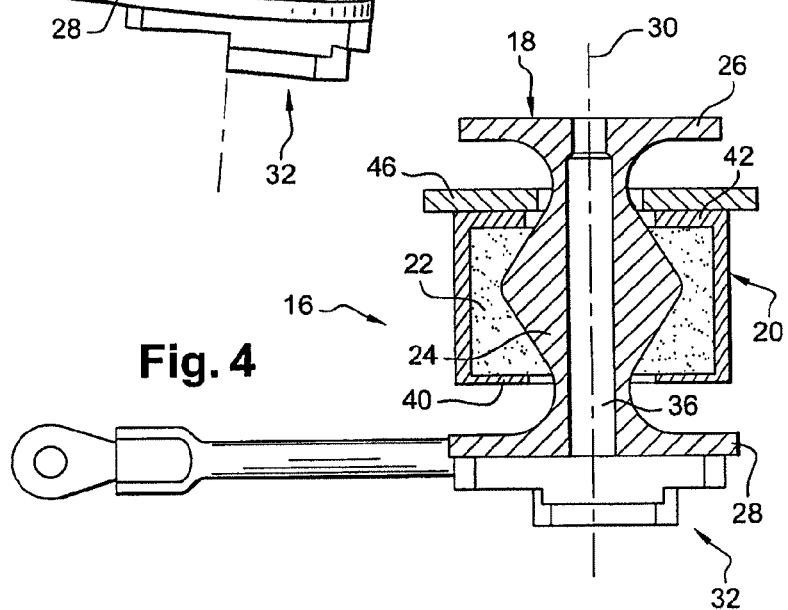
Figure 5:
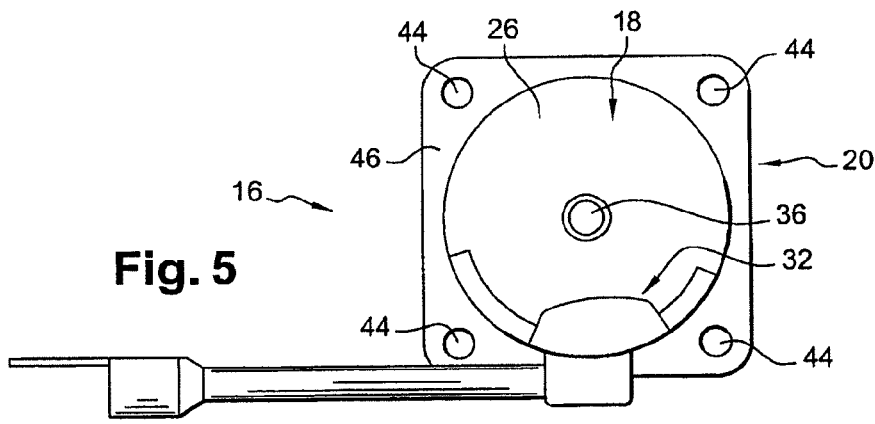
Figure 6:
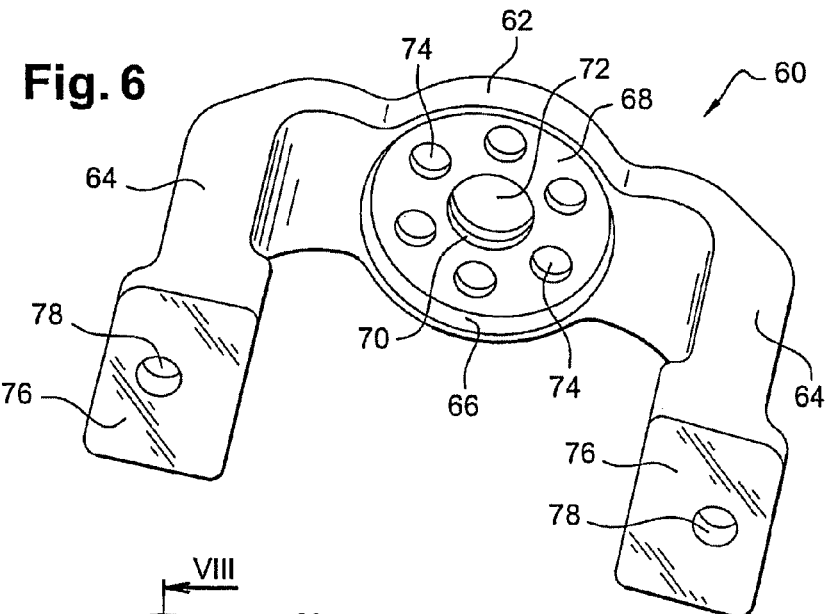
Figure 7:
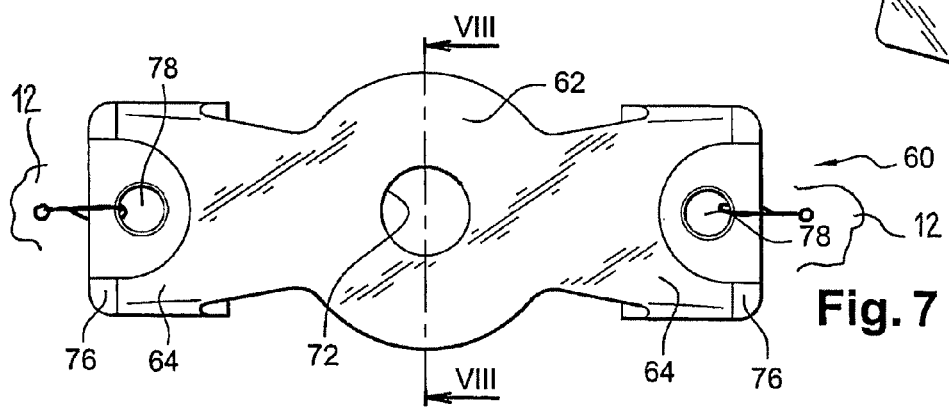
Figure 8:
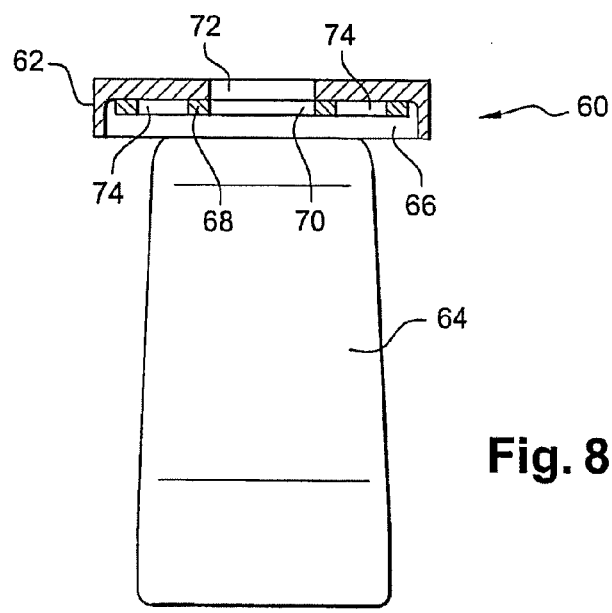
Figure 9:
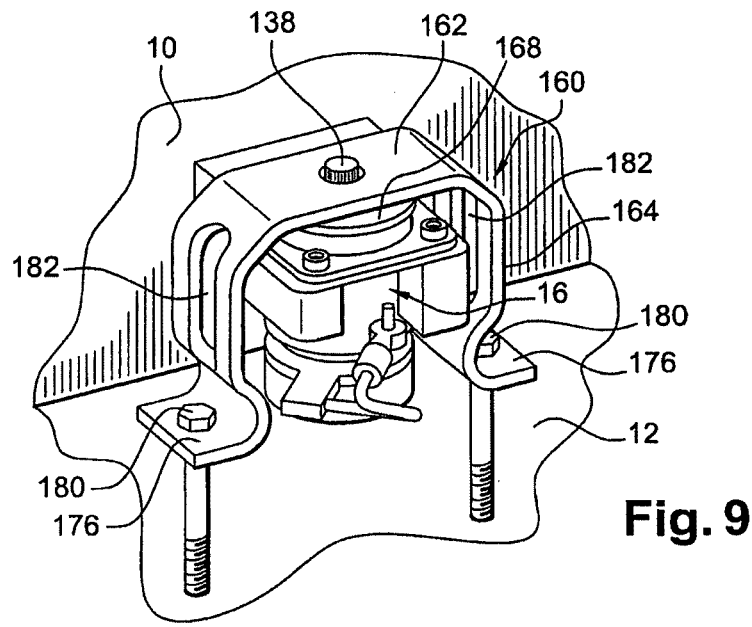
Figure 10:
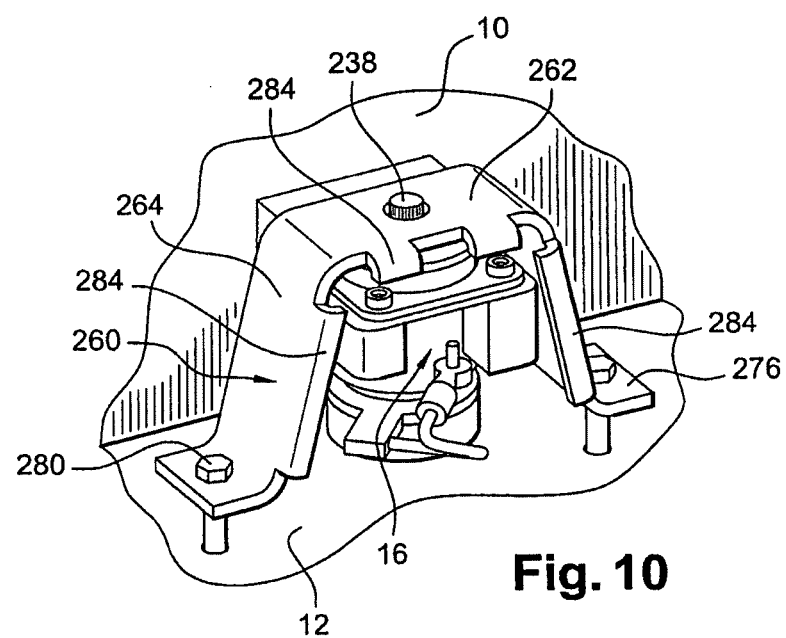

The invention will be better understood, and other details, characteristics and advantages of the present invention will become more clear after reading the description that follows, drawn up by way of a non-limiting example and with reference to the annexed drawings, in which:

FIG. 1 is a schematic perspective view of a piece of equipment mounted on an aircraft engine fairing by a device according to the invention, FIG. 2 is a larger-scale view of the detail $I_2$ in FIG. 1, FIG. 3 is a schematic perspective view of a vibration damper, FIG. 4 is a schematic view in axial section of the damper in FIG. 3, FIG. 5 is a schematic view from below of the damper in FIG. 3, FIG. 6 is a schematic perspective view of a safety device according to the invention, seen from below and from the side, FIG. 7 is a schematic view from above of the device in FIG. 6, FIG. 8 is a sectional view along the line VIII-VIII of FIG. 7, FIG. 9 is a schematic perspective view of an embodiment of the device according to the invention, FIG. 10 is a schematic perspective view of another embodiment of the device according to the invention.

FIGS. 1 and 2 show a piece of electrical equipment 10 that is fixed to a fairing 12 of an aircraft engine by a device secured according to the invention. This device may also be used to fix a non-electrical piece of equipment to an aircraft engine fairing.

The aircraft engine typically consists of a turbine engine, for example of the turbojet type, which is mounted coaxially inside a noticeably cylindrical nacelle. The equipment 10 is mounted, for example, on a fairing or a structure of the nacelle of this engine. The equipment 10 may be a computing unit, a control unit or a power unit, which is used, for example, to actuate an engine thrust reverser.

In the example shown, the equipment 10 has a general parallelepiped shape and consists at one end of means 14 of connection to other electrical equipment of the engine. The fairing 12 has a ring shape and may carry one or more other pieces of equipment.

This type of equipment is sensitive to vibrations and is generally suspended on the fairing 12 of the engine by one or more dampers 16 that allow this equipment to be insulated from the vibrations to which the engine is subjected in operation.

A piece of equipment 10 may be carried by four dampers 16, as is the case in the example shown (where only two dampers are visible in FIG. 1).

FIGS. 3 to 5 show a vibration damper 16. This damper 16 consists of two coaxial rotating parts 18, 20 connected to each other by elastically deformable annular means 22, one of the rotating parts 18 being fixed to the fairing 12 of the engine and the other rotating part 20 being fixed to the equipment 10.

The first rotating part 18, which is fixed to the fairing 12 of the engine, consists of a longitudinal shaft 24 of the axis 30, having, at its two ends, discs 26, 28 which are parallel to each other and perpendicular to the axis 30. In the example shown, the shaft 24 consists of a middle part whose transverse dimension is larger than its end parts.

The lower disc 28 is connected to latching means 32 (or suspension means) on the fairing 12 of the engine or to a support structure fixed to this fairing.

The shaft 24 consists of an axial bore 36 which is aligned with the corresponding orifices of the discs 26,28 for the insertion of a fixation screw 38 from the first part 18 of the damper into the fairing 12 of the aircraft engine (FIGS. 1 and 2).

The threaded portion of the screw 38 is secured axially through the orifice of the upper disc 26, the bore 36 of the shaft 24, then the orifice of the lower disc 28, and is screwed into a tapped hole in the fairing 12 or the support structure. In the tightened position, the head of this screw 38 is supported axially on the upper face of the upper disc 26.

The second part of the damper consists of a cylindrical housing 20 mounted coaxially around the shaft 24. This housing 20 contains at least one elastic annular lining 22 mounted coaxially between the external surface of the shaft 24 and the internal cylindrical surface of the housing 20. The housing 20 contains at its lower end and its upper end an annular edge 40, 42 that extends radially towards the axis 30, the internal rim of which is at a distance from the shaft 24.

A plate 46 is applied and fixed on the upper face of the upper edge 42 of the housing. This plate 46 has a square-shaped external contour and consists of a central orifice for the insertion of the shaft 24, the edge of this central orifice being located at a distance from the shaft 24. The plate 46 consists, in the vicinity of its angles, of orifices 44 for inserting the fixation screws 50 of the housing 20 to the equipment 10 (FIGS. 1 and 2).

The equipment 10 is connected to this housing 20 by means of two support fingers 48 that extend in parallel and at a distance from each other in a plane perpendicular to the axis 30 of the damper, whereby these support fingers 48 are connected at one of their ends to the equipment 10 and extend all along the housing 20 of the damper (FIG. 2).

Each finger 48 extends along one side of the plate 46 of the housing 20, below this plate, and consists of tapped holes aligned with the orifices 44 of the plate 46. The screws 50 fit into the orifices 44 of the plate and are screwed into the orifices of the fingers 48 to ensure the fixation of the housing 20 to the equipment 10.

The operation of this type of damper 16 is well-known to the person skilled in the art.

In the state of the art, the dampers 16 are held and fixed on the fairing 12 by means of screws 38 only, which traverse these dampers coaxially and are screwed into tapped holes in the support structures or the fairing. There is therefore a high risk of the equipment 10 becoming detached in the event of the failure or breakage of these dampers or their fixation screws 38.

For example, in the rare event of the breakage of a fan blade, this blade is ejected onto the engine nacelle, which causes a violent shock that can damage or even destroy the dampers 16. After shutting down the engine, the fan wheel is rotated by the windmilling effect, which manifests itself as severe vibrations of the engine. The violent shock and the vibrations can considerably reduce the service life of the dampers 16 and weaken the fixation screws 38 of the dampers in the fairing 12. In the event of the breakage of these screws 38, the equipment 10 is no longer held on the fairing and may be ejected and may destroy structures of the nacelle.

The invention allows this problem to be rectified thanks to an additional safety device associated with each of the dampers 16 for supporting and fixing the equipment 10. According to the invention, this device is mounted crosswise on the damper so as to keep the damper and the equipment 10 in place even in the event of the breakage of the fixation screws 38 of the dampers on the fairing.

In the embodiment shown in FIGS. 1, 2 and 6 to 8, the safety device is a stirrup 60 with the general shape of an inverted U. This stirrup 60 consists of a middle part formed from a circular plate 62, and two lateral feet 64 diametrically opposite to the axis of rotation of the plate 62.

The circular plate 62 forms a cap intended to cover or cap the upper end of the damper which, in the example, is represented by the upper disc 26 of the first part 18 of the damper. This plate 62 extends perpendicularly to the longitudinal axis 30 of the damper and therefore in parallel to the upper disc 26 of this damper.

This plate 62 consists of a lower ring-shaped reinforcement 66 complementary to that of the upper disc such that at least the upper part of this disc is housed inside this reinforcement 66 (FIGS. 6 and 8). This allows the correct operating position of the damper to be defined and prevents this damper from becoming separated from the fairing.

A ring-shaped gasket 68 is also housed in the reinforcement 66 of the plate 62 and sandwiched between the lower face of this reinforcement and the upper face of the disc 26 of the damper. This gasket 68 can be made from an elastically deformable material. It is notably able to catch any axial play in the assembly between the damper 16 and the stirrup 60.

The gasket 68 defines a central orifice 70 which is aligned with a corresponding central orifice 72 on the plate 62 of the stirrup for inserting the fixation screw 38. This screw fits axially into the orifices of the stirrup 60, the gasket 68 and the damper 16 and is screwed into a tapped hole in the support structure or the fairing. The head of this screw 38 is at least partly housed inside the orifices 70, 72 of the gasket 68 and the plate 62 and is supported on the upper face of the upper disc 26 of the damper.

The gasket 68 also contains through holes 74 (six in the example shown), which are regularly distributed around a circumference centred on the axis of rotation of the gasket. The size and shape of these holes 74 are determined so as to adapt the stiffness of the gasket 68 to the required specifications, to limit the forces transmitted to the upper disc 26 of the damper, and to allow elastic deformations of the gasket by tightening between the device and the damper, and to absorb play and differential expansion.

The feet 64 of the stirrup are noticeably parallel to each other and are each connected at their free ends to a small support plate 76 on the support structure or the fairing 12. These small plates 76 extend parallel to the circular plate 62 of the stirrup and each consist of an orifice 78 for the insertion of a screw 80 for fixing the stirrup to the support structure or the fairing.

The feet 64 are rigid and have a noticeable C shape in section, and their openings are oriented radially outwards in relation to the axis 30, in diametrically opposite directions, and allow the insertion of a tightening/loosening tool 80.

The stirrup 60 is sufficiently rigid to keep the damper in place, even in the event of the breakage of the central screw 38. The damper is then held in place by the stirrup, which is fixed to the fairing 12 by means of the screws 80. The feet 64 and the plate 62 are formed from a single part. The stirrup 60 is made, for example, from metal or a composite material.

In the variant shown in FIG. 9, the safety device is a stirrup 160 having a general Ω shape. This stirrup consists of a rectangular-shaped middle plate 162 which is connected at two opposite lateral ends to feet 164 with a noticeably S-shaped profile. These S-shaped feet 164 endow the stirrup with a certain flexibility with slight elastic deformability.

These feet 164 are connected at their upper ends to the plate 162 and include, at their lower ends 176, edges oriented noticeably in parallel to the plate 162 and radially towards the outside in relation to the longitudinal axis 30 of the damper. These lower ends of the feet 164 are applied to a support structure or to the fairing 12 of the engine, and include orifices for the insertion of screws 180 for fixing the stirrup to the structure or fairing. Each foot consists of a slit 182 that extends noticeably in parallel to the longitudinal axis 30 of the damper. These slits 182 allow the stirrup to be lightened, to increase its flexibility, and allow the insertion of a tool for tightening/loosening the screws 180 to fix the stirrup to the fairing.

This stirrup 160 is mounted crosswise on the damper, and its middle plate 162 is applied and tightened on the upper disc 26 of the damper thanks to the fixation screws 180. The middle plate 162 consists of a central orifice for the insertion of the head of the screw 138 to fix the damper 16 to the fairing. The middle plate 162 can also consist of a lower housing reinforcement of the upper disc 26 of the damper. A ring-shaped gasket 168 may also be sandwiched between the plate 162 of the stirrup and the upper disc of the damper.

This stirrup 160 may be made from metal or a composite material, and is preferably formed from a single part.

In the variant shown in FIG. 10, the stirrup 260 has the general shape of an inverted V or U, with its lateral legs 264 inclined to each other at an angle of between 30 and 90° approximately. These legs 264 are connected to two opposite ends of a rectangular-shaped middle plate 262 that caps the damper 16. The free ends 276 of the feet 264 are similar to the free ends 176 of the legs of the stirrup 160 in FIG. 9. The feet 264 and the middle plate 262 of the stirrup also consist of lateral edges 284 with a rounded shape which are oriented towards the damper so as to limit the deformations in flexion and torsion of the stirrup 260.

This stirrup 260 is made of metal or a composite material and is formed of a single part.

In another variant, the safety device consists of a noticeably flat plate, comparable to plates 62, 162, 262, that caps the upper end of the damper and is directly fixed at two opposite ends to the fairing or a support structure of the engine.

In yet another variant, this type of flat plate is fixed to the fairing or the support structure by means of tensioned cables (FIG. 7).

The invention claimed is:

1. A device for supporting and fixing equipment to a nacelle fairing or aircraft engine fairing, the device comprising:
   at least one vibration damper including:

a first rigid part configured to be fixed to the fairing through a first fixation, a second rigid part configured to be connected rigidly to the equipment, so as to suspend the equipment on the fairing, the second rigid part being structurally separated from the first rigid part, and an elastically deformable material interposed between the first rigid part and the second rigid part, so that any one of the first rigid part and the second rigid part is movable with respect to the other of the first rigid part and the second rigid part by deforming said elastically deformable material; and a rigid safety device structurally separated from the first and second rigid parts and configured to keep the damper in position on the fairing in an event of a failure or a breakage of at least one of the damper and said first fixation, to ensure support and fixation of the equipment, whereby the rigid safety device is independent of the damper and is mounted crosswise on the damper, whereby the rigid safety device includes a middle rigid part that at least partly caps or covers the damper, and lateral opposite ends configured to be fixed to the fairing through a second fixation, whereby the first fixation is independent of the second fixation.

2. A device according to claim 1, wherein the middle rigid part of the rigid safety device includes a flat plate with a circular or rectangular shape.

3. A device according to claim 2, wherein the plate includes, at two opposite ends of the plate, cables configured to be fixed to the fairing.

4. A device according to claim 2, wherein the plate is directly fixed at two opposite ends to the fairing.

5. A device according to claim 2, wherein the plate includes, at two opposite ends of the plate, lateral feet configured to be fixed to the fairing.

6. A device according to claim 5, wherein the rigid safety device is a stirrup and has a general Ω shape, or an inverted U or V shape.

7. A device according to claim 5, further comprising a gasket sandwiched between the middle rigid part of the rigid safety device and an upper end of the first rigid part of the damper, whereby the gasket is made from an elastically deformable material or a material with a high friction coefficient.

8. A device according to claim 7, wherein the gasket is housed in a lower reinforcement of the middle rigid part of the rigid safety device.

9. A device according to claim 7, wherein the middle rigid part of the rigid safety device includes a central orifice aligned with an orifice of the gasket to insert a screw to fix the rigid safety device to the first rigid part of the damper.

10. A device according to claim 5, wherein the feet of the rigid safety device are noticeably parallel to each other or form between themselves an angle of between 30 and 90° approximately.

11. A device according to claim 5, wherein each of the feet of the rigid safety device has a noticeable C or S shape in section.

12. A device according to claim 11, wherein the feet each include at least one slit extending along an axis of the damper.

13. A device according to claim 5, wherein the middle rigid part and the lateral feet of the rigid safety device includes noticeably flat plates, whereby the plates include, on sides of the plates, rounded edges oriented towards the damper.

14. A device according to claim 5, wherein the feet include, at free ends of the feet, small plates or support edges on the fairing, whereby the small plates or edges contain orifices to insert screws to fix the rigid safety device to the fairing.

15. A device according to claim 5, wherein the rigid safety device is of a single part and is made from metal or a composite material.

16. An aircraft engine, comprising:
a turbine engine surrounded coaxially by a nacelle; and
at least one piece of equipment suspended on a turbine engine fairing or a nacelle fairing by a device according to claim 1.

17. A device according to claim 1, wherein the middle rigid part of the rigid safety device is crossed by a first orifice through which freely passes a screwing part passing through a second orifice of the first rigid part, said screwing part pressing at a first end of the first rigid part, while being at a second end screwed to one of the fairing and a support structure fixed to the fairing.

18. A device according to claim 1, wherein the elastically deformable material is interposed between the first rigid part and the second rigid part so that any one of the first rigid part and the second rigid part is movable in any direction with respect to the other of the first rigid part and the second rigid part by deforming said elastically deformable material.

19. A device for supporting and fixing equipment to a nacelle fairing or aircraft engine fairing, the device comprising:
at least one vibration damper including:
a first rigid part configured to be fixed to the fairing through a first fixation,
a second rigid part configured to be connected rigidly to the equipment, so as to suspend the equipment on the fairing, the second rigid part including a hollow housing surrounding a portion of the first rigid part, and
an elastically deformable material completely surrounding the portion of the first rigid part, by filling the hollow housing around said portion of the first rigid part, so that any one of the first rigid part and the second rigid part is movable with respect to the other of the first rigid part and the second rigid part by deforming said elastically deformable material; and
a rigid safety device configured to keep the damper in position on the fairing in an event of a failure or a breakage of at least one of the damper and said first fixation, to ensure support and fixation of the equipment, whereby the rigid safety device is independent of the damper and is mounted crosswise on the damper,
whereby the rigid safety device includes a middle rigid part that at least partly caps or covers the damper, and lateral opposite ends configured to be fixed to the fairing through a second fixation,
whereby the first fixation is independent of the second fixation.

20. A device according to claim 19, wherein the first rigid part, the second rigid part, and the rigid safety device are respective separately manufactured rigid elements.

* * * * *